United States Patent [19]

Harris

[11] 4,017,918
[45] Apr. 19, 1977

[54] METAL CRIB STRUCTURE
[75] Inventor: George M. Harris, Chicago, Ill.
[73] Assignee: Harris-Hub Co., Inc., Harvey, Ill.
[22] Filed: Jan. 8, 1976
[21] Appl. No.: 647,576
[52] U.S. Cl. .................................. 5/100; 256/21; 403/237
[51] Int. Cl.[2] .................. E03D 11/10; A47F 3/00; F16M 11/20
[58] Field of Search .............. 256/21, 24, 8, 9; 5/100, 279 R, 279 B, 282 R, 286; 403/237

[56] References Cited
UNITED STATES PATENTS

| | | | |
|---|---|---|---|
| 3,336,605 | 8/1967 | Neunherz | 5/9 R |
| 3,506,989 | 4/1970 | Ross et al. | 5/100 |
| 3,851,981 | 12/1974 | Corsi | 403/237 |
| 3,855,654 | 12/1974 | Pivacek | 5/100 |
| 3,900,907 | 8/1975 | Mulder | 5/100 |
| 3,911,510 | 10/1975 | Bryant | 5/100 |

Primary Examiner—Casmir A. Nunberg

[57] ABSTRACT

A crib having a plurality of sides each of which consists of upper and lower horizontal rods with a plurality of vertical rods extending therebetween is disclosed herein. The vertical and horizontal rods are interconnected by inserts that are positioned in opposite ends of the vertical rods and have projections extending into openings in the horizontal rods as well as interconnecting means between the upper and lower horizontal rods for maintaining the rods and inserts in an assembled condition.

8 Claims, 4 Drawing Figures

METAL CRIB STRUCTURE

BACKGROUND OF THE INVENTION

The present invention relates generally to crib structures and more particularly to cribs that are formed from metal rods.

Conventional cribs used for infants normally consist of a plurality of sides each of which is formed by a plurality of horizontally spaced vertically extending slats between upper and lower horizontal slats. Most of the cribs that are available today are made from wood to simplify the construction and assembling of crib structures. Wooden cribs have inherent problems in that infants have a tendency to "teethe" on the rail structure or slats. This results in the chipping of the paint off the slats as well as removing some of the wood during the life of the crib.

In addition to the above problem, with the continual shortage of quality wood, the cost of such cribs has increased substantially.

Quite recently, it has been proposed to form crib structures from metal rods rather than wood. All of the known crib structures commercialized to date have the vertical and horizontal rods interconnected by a welding process. In utilizing welding for interconnecting the horizontal and vertical rods, most of the cost for constructing a crib is in the assembling of the units. For example, it is extremely time consuming to weld the numerous vertical rods to the respective horizontal rods to form an entire crib.

Also, in order to have an attractive crib, most metal cribs have the rods coated with brass or other types of material. When a welding process is utilized, it is necessary to coat the weld as well as the area adjacent the weld with brass after the respective rods have been interconnected. The net result is that the cost of manufacturing such a unit is far in excess of the cost of manufacturing a wooden unit so that the metal crib is no longer competitive with the wooden crib.

SUMMARY OF THE INVENTION

According to the present invention, a metal crib is formed without utilizing any welding which eliminates a substantial portion of the cost of a unit and also results in eliminating the need for coating of any parts after they have been assembled.

According to the present invention, the horizontal and vertical rods of each side of a crib are interconnected by a plurality of inserts that are respectively received into opposite sides of the vertical rod and have projections which extend into openings in the horizontal rods. The interconnected horizontal and vertical rods are maintained in an assembled condition by connecting means that extend between the upper and lower horizontal rods.

More specifically, the inserts each include one end that is received into the open end of a hollow vertical rod with an enlarged portion intermediate opposite ends engaging the end of the vertical rod. The enlarged portion has a concave surface which corresponds to the configuration of the periphery of the horizontal rod and a projection extends from the concave surface and is received into openings in the respective horizontal rods.

In the specific embodiment, the connecting means between the upper and lower horizontal rods consists of apertured inserts, similar to the ones described above, received into opposite ends of a vertical rod and the apertures replace the projections. A tie rod then extends through the apertured inserts and openings in the horizontal rods aligned with the apertures to interconnect the horizontal rods. The tie rods can also be used for connecting end connectors to opposite ends of the horizontal rods that are used to support the sides on vertical guides supported on the corner posts.

DETAILED DESCRIPTION

Figure 1:
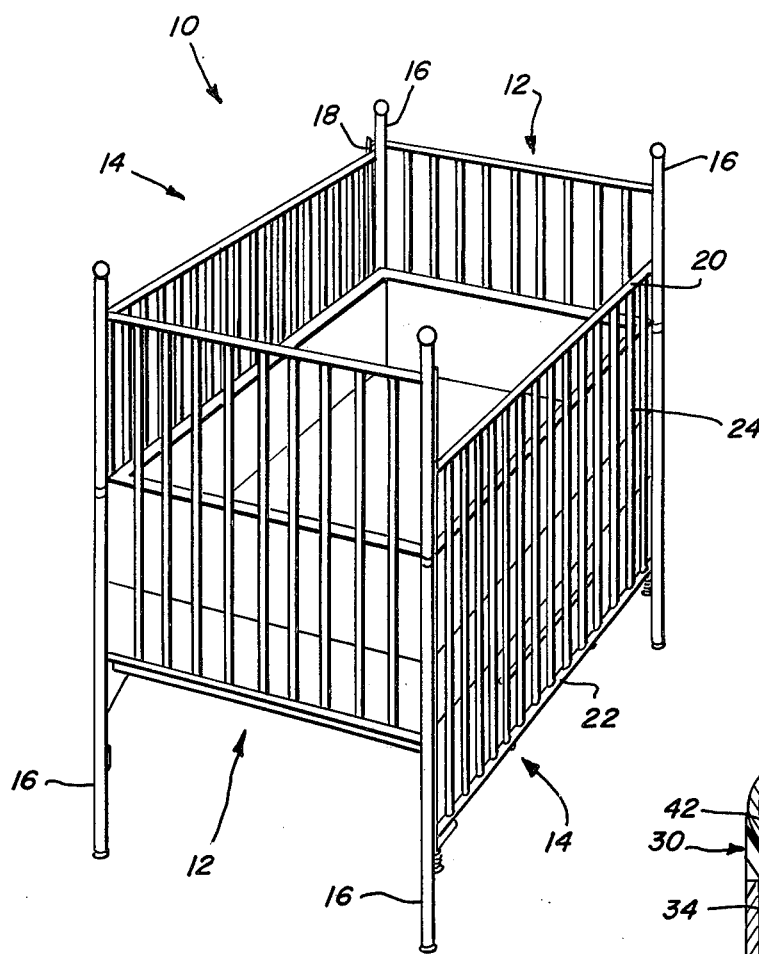
FIG. 1 shows a perspective view of a crib unit having the present invention incorporated therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 shows a perspective view of the crib generally designated by the reference numeral 10 consisting of two sides 12 defining end sections and two sides defining side sections 14 as well as four corner posts 16. As is conventional in units of this type, the side sections 14 are supported on vertical rods 18 so that either side section can be raised or lowered with respect to the end sections 12. Each section 12, 14, consists of upper and lower horizontal rods 20 and 22 as well as plurality of vertical rods 24 extending between horizontal rods 20 and 22.

According to the present invention, the horizontal and vertical rods 20, 22 and 24, are all hollow metal rods that are interconnected in a unique fashion to eliminate the need for any welding and subsequent braising or coating of the weld as well as the adjacent parts.

More specifically, the horizontal and vertical rods of each section or side 12, 14, are interconnected by inserts 30 and connecting means 32 in a fashion that eliminates a substantial amount of machining and other ancillary steps that have heretofore been necessary for producing cribs from metal rods. In fact, the entire sections can be assembled without the use of any tools which means that the sections can be shipped in an unassembled condition, if desired.

As most clearly shown in FIGS. 2 and 3, vertical and horizontal rods 20, 22 and 24 are circular hollow metal members that have a common dimeter and each vertical rod 24 (with the exception of the rods having connecting means 32 to be described later) has an insert 30 received into each end. Each insert 30 consists of a nonmetallic member that has a first reduced end portion 34 received into the open end of vertical rod 24. An inspection of FIGS. 2 and 3 reveals that end portion 34 of insert 30 has a size corresponding to the internal dimension of the vertical rod 24 and is circular in cross section.

Each insert 30 also has an enlarged portion 36 that engages the adjacent end of vertical rod 24. It will be noted in FIGS. 2 and 3 that the end of vertical rod 24 is flat and defines a plane that extends substantially perpendicular to the longitudinal axis of the vertical rod. Also, enlarged portion 36 has a peripheral configuration which correponds to the peripheral configuration of the vertical rod so that insert 30 defines what appears to be an integral extension for vertical rod 24.

Each insert 30 also has an outwardly directed concave arcuate surface 38 which corresponds in configuration to the periphery of horizontal rods 20 and 22. Since horizontal rods 20 and 22 as well as vertical rods 24 are identical in cross section, the upper and lower inserts received into the respective ends of vertical rods are interchangeable. Each insert 30 also has a projection 40 extending outwardly from concave surfaces 38 and projection 40 is received into an opening 42 located in horizontal rod 20 or 22.

Figure 3:
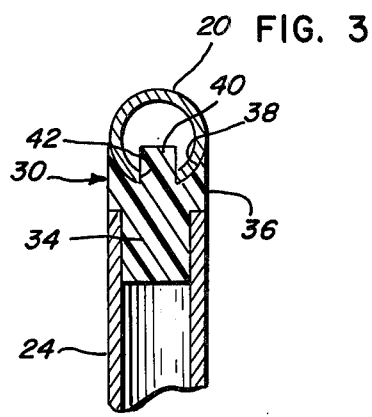
FIG. 3 is a sectional view as viewed along line 3—3 of FIG. 2.

In the assembled condition illustrated in FIG. 3, it will be noted that the inserts 30 provide an extremely attractive interconnection between the horizontal and vertical rods which does not require any welding, bolts or other securing devices. Also, the particular configuration of insert 30 simplifies the construction and assembly of the respective sides for the crib since all of the vertical and horizontal rods can be cut at right angles to the longitudinal axis of the rod. Again, this arrangement reduces the costs involved in that it is no longer necessary to produce an arcuate cut in the upper and lower ends of the vertical rod which is required in a welding process to have a unique appearance of the assembled unit.

Figure 2:
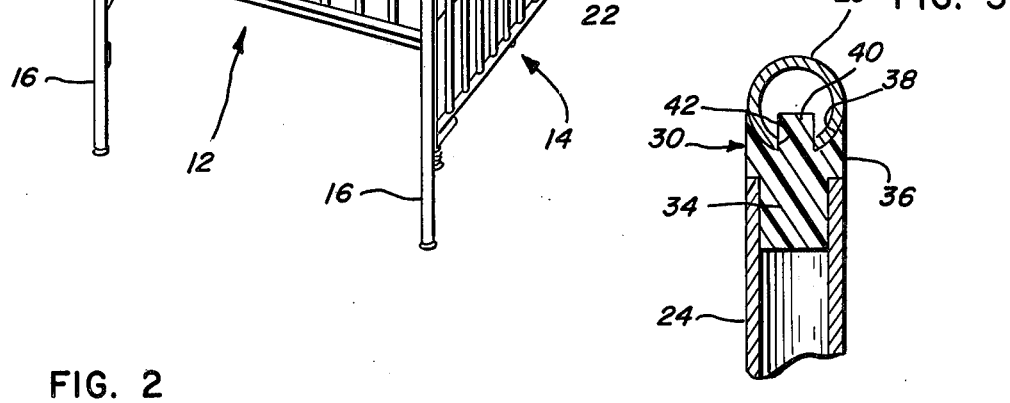
FIG. 2 has a enlarged fragmentary view showing an insert located between a vertical rod and a horizontal rod.

The respective inserts, horizontal rods and vertical rods are all held in an assembled condition illustrated in FIGS. 2 and 3 by connecting means 32 that are associated with selected vertical rods and the number of such connecting means will be dependent upon the overall size of the assembly. For example, each side will preferably have a connecting means 32 associated with each of the vertical rods at opposite ends of side 14 and one or more such connecting means associated with vertical rods intermediate opposite ends of side 14.

Figure 4:
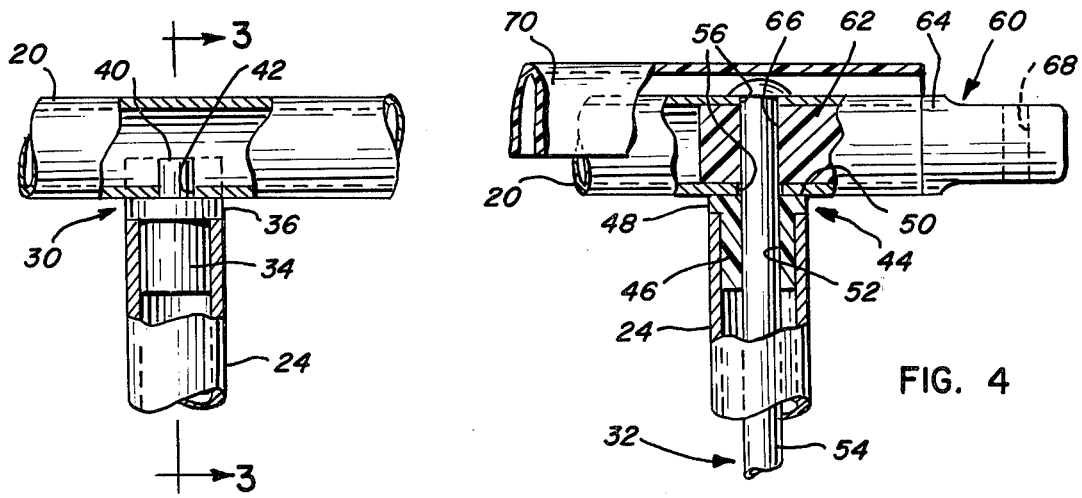
FIG. 4 is an enlarged fragmentary view showing connecting means between horizontal rods.

Referring to FIG. 4, it will be noted that connecting means 32 again consists of an insert 44 which is in many respects similar to insert 30. Insert 44 again has a portion 46 received into the open end of vertical rod 24 and an enlarged portion 48 that engages the upper end of vertical rod 24. The outer end of enlarged portion 48 also has a concave surface 50 similar to concave surface 38. Insert 44 has an aperture 52 extending therethrough with a tie rod 54 extending through apertured inserts 44 received in opposite ends of a vertical rod 24. Each horizontal rod 20 and 22 also has aligned opening 56 which are adapted to be aligned with aperture 52 so that tie rods 54 can extend through aligned openings 56, apertures 52 and the internal opening in hollow vertical rod 24. The opposite end of tie rod 54 (not shown) likewise extends through openings in the lower horizontal rods 22 and is threaded to receive a wing nut. It will be appreciated that with at least two of such connecting means 32 associated with each side member, the entire assembly can be held in assembled condition and the assembly process is extremely simple, substantially reducing the cost involved.

According to another aspect of the invention, connecting means 32 is also utilized for defining a connection between the respective sides 14 and vertical guide rods 18. As illustrated in FIG. 4, the opposite open ends of both horizontal rods 20, 22 (only one being shown) has a connector 60 received therein. Connector 60 has a portion 62 which has a configuration that corresponds to the internal configuration of horizontal rod 20, 22, and an enlarged portion 64 engaging an outer end of an associated horizontal rod. Portion 62 has an opening extending transversely therethrough which, when connector 60 is fully inserted to the position illustrated in FIG. 4, is aligned with openings 56. Thus, tie rod 54 may be utilized for holding connector 60 in an assembled condition with respect to horizontal rod 20, 22. The outer end of connector 60 also has an opening 68 which receives slide rod 18 to guide the entire side 14 for vertical movement relative to the remainder of the crib.

Each of the upper horizontal rods of the respective sides preferably also has a teething protector 70 thereon. Teething protector 70 is preferably U-shaped in cross section and covers at least the upper portion of upper horizontal rods 20, as well as the exposed portions of tie rods 54.

To complete the assembly, end pieces 12 are preferably connected to the respective corner posts 16 at opposite ends through rods that extend through upper and lower horizontal rods of the respective end pieces.

While the material utilized in forming inserts 30, 44, and connectors 60 forms no part of the invention, it is preferable that these be formed from a plastic or resinous synthetic material and one material that has been found to be acceptable is a material sold under the trademark, Cycolac (Borg-Warner Corporation).

As can be appreciated from the above description, the present invention provides a unique arrangement for interconnecting a plurality of rods without utilizing any welding or a large number of bolts and screws. Furthermore, the assembled article is extremely attractive in appearance because of the particular construction of the inserts 30 which produce a smooth merger between the vertical rods and the horizontal rods and very few elements are exposed after the unit has been completely assembled. In fact, the respective sides can be assembled without the need for any tools.

What is claimed is:

1. In a crib having a plurality of sides with at least one side including upper and lower circular horizontal metal rods and a plurality of spaced hollow vertical metal rods with interconnecting means between said horizontal and vertical rods, the improvement of said interconnecting means including a plurality of inserts respectively received into opposite ends of said vertical rods, each of said inserts having opposite ends, one of said ends having a size corresponding to the internal dimension of said vertical rods to be received therein, each of said inserts having an enlarged portion engaging an end of a vertical rod, the opposite end of each insert having a concave arcuate surface corresponding in configuration to the periphery of said horizontal rods and a projection extending from said concave surface, said upper and lower horizontal rods having openings receiving said projections, and connecting means between said upper and lower horizontal rods for maintaining said rods and inserts in assembled relation.

2. A crib as defined in claim 1, in which said vertical rods are circular and in which said enlarged portions have a peripheral configuration corresponding to the peripheral configuration of vertical rods.

3. A crib as defined in claim 2, in which opposite ends of said vertical rods are flat and define planes extending substantially perpendicular to the longitudinal axes of the vertical rods.

4. A crib as defined in claim 1, in which each connecting means includes apertured inserts respectively received into opposite ends of one vertical rod, each apertured insert having a concave surface corresponding in configuration to the periphery of said horizontal rods with said horizontal rods having openings aligned with the apertures in said apertured inserts and a tie rod extending through said one rod aligned openings and apertures.

5. A crib as defined in claim 4, in which said horizontal rods are open at opposite ends and have connectors received therein and in which there is a connecting means associated with each vertical rod at opposite ends of said horizontal rods with said tie rods respectively extending through openings in said connectors to secure said connectors to said horizontal rods.

6. In a crib having a plurality of sides with each side including upper and lower hollow, circular, horizontal metal rods having a common diameter and a plurality of transversely spaced hollow, circular, vertical metal rods with interconnecting means between said vertical and horizontal rods, the improvement of said interconnecting means including a pair of inserts respectively received into opposite open ends of each of a plurality of rods, each of said inserts having a peripheral configuration corresponding to the peripheral configuration of said vertical rods with a reduced portion received into the open end of a vertical rod, each of said inserts having a concave surface engaging a peripheral portion of a horizontal rod and a projection extending from said concave surface with an opening in the horizontal rod receiving said projection, and at least two of said vertical rods having apertured inserts received into opposite ends of the vertical rod and a concave surface engaging a horizontal rod, said horizontal rods having further openings aligned with the apertures in said apertured inserts and tie rods extending through said apertures and further openings to interconnect said horizontal rods.

7. A crib as defined in claim 6, in which said at least two vertical rods are the vertical rods at opposite ends of a side and in which each end of said horizontal rods is open and has a connector therein, said connectors having additional openings aligned with said further openings with said tie rods extending therethrough to connect said connectors to said horizontal rods.

8. A crib as defined in claim 6, in which said vertical rods have peripheral and internal diameters equal to the diameters of said horizontal rods.

* * * * *